United States Patent
Chu et al.

(10) Patent No.: US 6,452,790 B1
(45) Date of Patent: Sep. 17, 2002

(54) COMPUTER MODULE DEVICE AND METHOD

(75) Inventors: William W. Y. Chu, Los Altos; Tony Man, Danville; Peng Cheng Lin, Cupertino, all of CA (US)

(73) Assignee: Acquis Technology, Inc., Mountain View, CA (US)

( * ) Notice: Subject to any disclaimer, the term of this patent is extended or adjusted under 35 U.S.C. 154(b) by 80 days.

(21) Appl. No.: 09/610,581

(22) Filed: Jul. 5, 2000

Related U.S. Application Data

(60) Provisional application No. 60/142,860, filed on Jul. 7, 1999.

(51) Int. Cl.⁷ .................................................. H05K 7/20
(52) U.S. Cl. ................... 361/683; 361/686; 361/687; 361/695; 364/708.1; 395/733
(58) Field of Search ................................. 361/683, 686, 361/687, 699, 707–709, 692, 695, 704, 679, 724–727, 752, 753, 796; 364/708.1, 709.01, 709.02, 709.07–709.11; 395/186, 700, 275, 325; 710/101, 72, 129, 62, 71, 106, 100, 102, 200, 103; 345/169, 326, 327, 333, 302, 156, 418, 733, 500; 713/300, 322, 1, 310, 320, 323, 330, 340, 204, 200, 202

(56) References Cited

U.S. PATENT DOCUMENTS

| | | | | |
|---|---|---|---|---|
| 5,436,857 A | * | 7/1995 | Nelson et al. | 364/708.1 |
| 5,463,742 A | * | 10/1995 | Kobayashi | 395/281 |
| 5,550,710 A | * | 8/1996 | Rahamim et al. | 361/687 |
| 5,630,057 A | * | 5/1997 | Hait | 395/186 |
| 5,948,047 A | * | 9/1999 | Jenkins et al. | 395/733 |
| 6,216,185 B1 | * | 4/2001 | Chu | 710/101 |
| 6,311,268 B1 | * | 10/2001 | Chu | 713/1 |
| 6,314,522 B1 | * | 11/2001 | Chu et al. | 713/322 |
| 6,321,335 B1 | * | 11/2001 | Chu | 713/200 |

* cited by examiner

Primary Examiner—Darren Schuberg
Assistant Examiner—Michael Datskovsky
(74) Attorney, Agent, or Firm—Townsend and Townsend and Crew LLP

(57) ABSTRACT

A method for installing memory into a computer module. The method includes providing a used computer module, which comprises a housing to enclose a hard disk drive, a memory module for random access memory devices and a central processing unit coupled to the hard disk drive and coupled to the random access memory. The method also includes removing a top cover from a base of the housing to expose the hard disk drive and the memory module. Thereafter, the hard disk drive is removed from the base of the housing and a second hard disk drive is inserted onto the base. The top cover is reattached to the base of the housing to complete the installation process.

6 Claims, 9 Drawing Sheets

COMPUTER MODULE DEVICE AND METHOD

CROSS-REFERENCES TO RELATED APPLICATIONS

This application claims priority to U.S. Ser. No. 60/142,860 filed Jul. 7, 1999, incorporated by reference for all purposes.

BACKGROUND OF THE INVENTION

The present invention relates to computing devices. More particularly, the present invention provides a method and device for securing a personal computer or set-top box. Merely by way of example, the present invention is applied to a modular computing environment for desk top computers, but it will be recognized that the invention has a much wider range of applicability. It can be applied to other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive including memory in the giga-byte range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 19 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. he keyboard is generally configured similar to a typewriter format. The keyboard also as the length and width for easily inputting information by way of keys to the computer. he mouse also has a sufficient size and shape to easily move a cursor on the display from one location to another location.

Other types of computing devices include portable computing devices such as "laptop" computers and the like. Although somewhat successful, laptop computers have many limitations. These computing devices have expensive display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals the are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use. The docking station typically includes a separate monitor, keyboard, mouse, and the like and is generally incompatible with other desktop PCs. The docking station is also generally not compatible with portable computers of other vendors. Another drawback to this approach is that the portable computer typically has lower performance and functionality than a conventional desktop PC. For example, the processor of the portable is typically much slower than processors in dedicated desktop computers, because of power consumption and heat dissipation concerns. As an example, it is noted that at the time of drafting of the present application, some top-of-the-line desktops include 400 MHz processors, whereas top-of-the-line notebook computers include 266 MHz processors.

Another drawback to the docking station approach is that the typical cost of portable computers with docking stations can approach the cost of having a separate portable computer and a separate desktop computer. Further, as noted above, because different vendors of portable computers have proprietary docking stations, computer users are held captive by their investments and must rely upon the particular computer vendor for future upgrades, support, and the like. Accordingly, industry desires a computer of a modular design. Unfortunately, many computer designs that are modular are often difficult to implement. Additionally, they are also plagued with heating problems from the microprocessor. Further, they are often difficult to make or manufacture efficiently.

Thus, what is needed are computer systems that provide improved modular designs is highly desirable.

SUMMARY OF THE INVENTION

According to the present invention, a technique including a method and device for a computer module in a computer system is provided. In an exemplary embodiment, the present invention provides a novel modular design for an attached computer module ("ACM"). In an embodiment, the ACM inserts into a computer module bay (CMB) within a peripheral console to form a functional computer.

In a specific embodiment, the present invention provides a computer module device. The device has a housing comprising a first end coupled to a second end, and a base plate coupled between the first end and the second end. The first end faces the second end, where the base plate is disposed between the first end and the second end. The device also has a first region disposed on the base plate at the second end. The first region comprises a connector, which faces (e.g., protrudes) outwardly from the housing from the second end. The device has a second region disposed between the first end and the second end, and is adjacent to the first end. The second region comprises a hard drive memory, e.g., disk drive. The device has a third region disposed between the first end and the second end. The third region is adjacent to the first region and is adjacent to the second end. The third region comprises a microprocessing unit. The first region and the third region are disposed along the first end of the housing and the second region is disposed along the second end of the housing to maximize a distance between the microprocessing unit and the hard disk drive to prevent a possibility of thermal damage of the hard disk drive from thermal energy from the microprocessing unit during operation.

In an alternative embodiment, the present invention provides a method for installing memory into a computer module. The method includes providing a used computer module, which comprises a housing to enclose a hard disk drive, a memory module for random access memory devices and a central processing unit coupled to the hard disk drive and coupled to the random access memory. The method also includes removing a top cover from a base of the housing to expose the hard disk drive and the memory module. Thereafter, the hard disk drive is removed from the base of the housing and a second hard disk drive is inserted onto the base. The top cover is reattached to the base of the housing to complete the installation process.

In a further embodiment, the invention provides a method of installing battery into a computer module. The method includes providing a used computer module, which may have a "bad" battery, e.g., unreliable or low power. The used computer module comprises a housing to enclose a hard disk drive, a battery socket comprising a plug-in battery, and a central processing unit coupled to the hard disk drive and coupled to the battery socket. The method removes a top cover from a base of the housing to expose the battery socket; and thereafter removes the used battery from the battery socket. A second battery is inserted into the socket. The top cover is them attached to the base of the housing.

Numerous benefits are achieved using the present invention over previously existing techniques. For example, the present invention provides a novel design that reduces thermal damage to computing elements in the modular design. Additionally, the present invention provides a small form factor, which can be implemented on a variety of computing platforms. Further, the present invention provides an efficient layout of device elements all within a housing. The present invention is also implemented using conventional technologies that can be provided in the present computer system in an easy and efficient manner. Depending upon the embodiment, one or more of these benefits can be available. These and other advantages or benefits are described throughout the present specification and are described more particularly below.

These and other embodiments of the present invention, as well as its advantages and features, are described in more detail in conjunction with the text below and attached Figs.

DESCRIPTION OF THE SPECIFIC EMBODIMENTS

According to the present invention, a technique for implementing a computer module such as a removable "Adaptable Computer Module (ACM)" is provided. ACM combined with peripheral console functions as a personal computer referred to as Adaptable Purpose Computer (APC). In exemplary embodiments, the ACM has a small form factor for use in a variety of computer applications. This small form factor often leads to heating limitations that the present invention solves.

Figure 1:
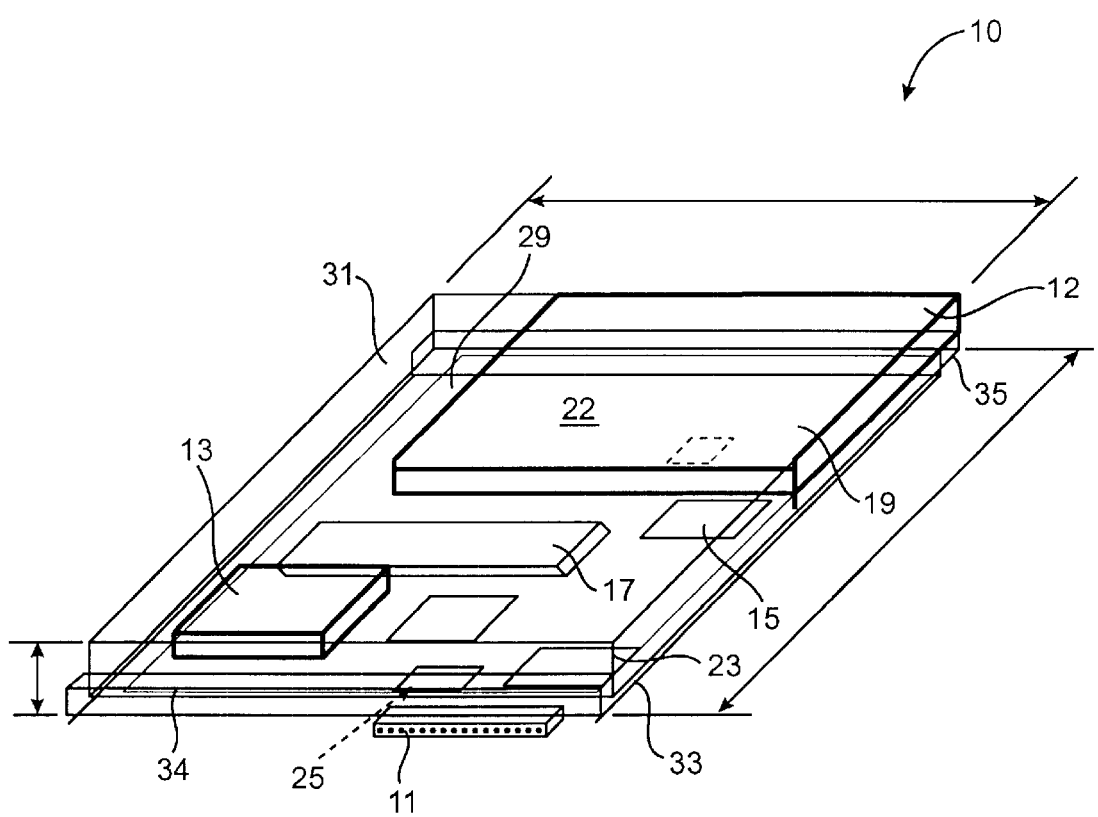
FIGS. 1 to 3 are simplified diagrams of ACMs according to embodiments of the present invention.
Figure 2:
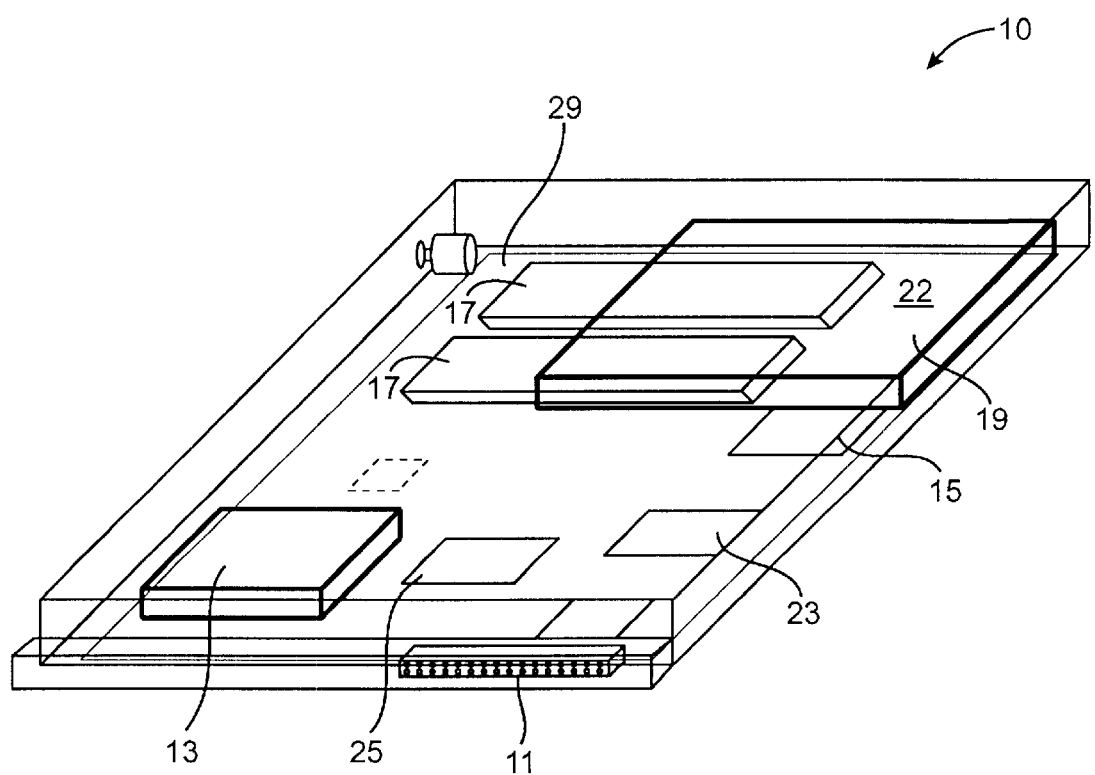
Figure 3:
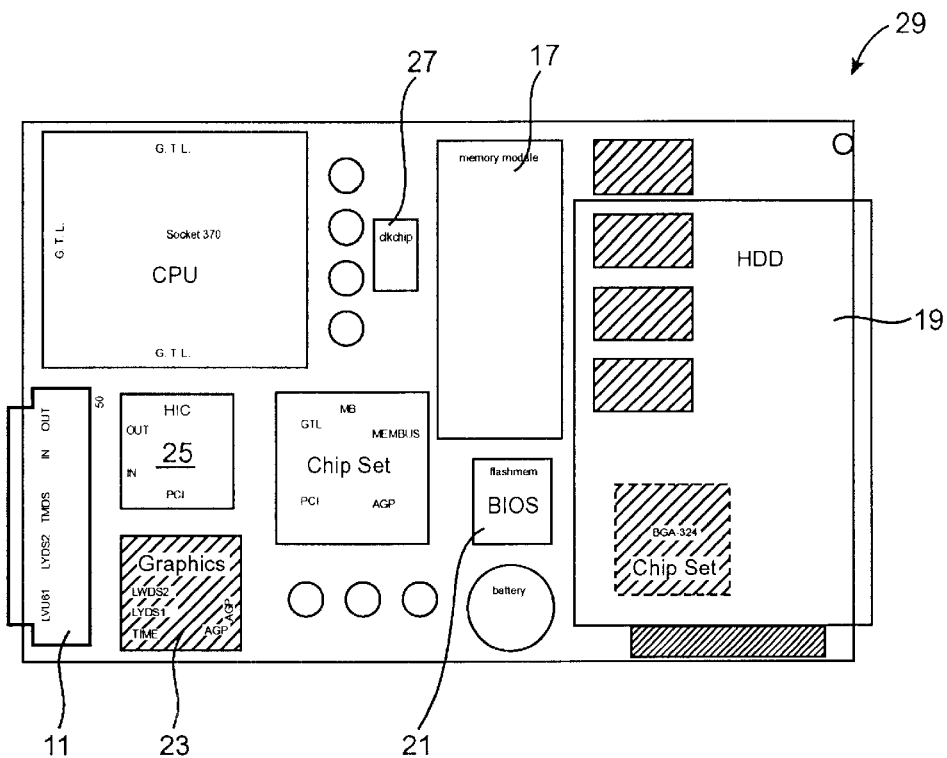

FIGS. 1 to 3 are simplified diagrams of ACMs according to embodiments of the present invention. These diagrams are merely examples which should not limit the scope of the claims herein. One of ordinary skill in the art would recognize many other variations, modifications, and alternatives. Like reference numerals are used in these Figs. for cross-referencing purposes only. They are not intended to be limiting in any manner. Referring to the Figs., ACM 10 is an enclosed box 12 with one connector 11 on one end that mates with a respective receptacle connector within a peripheral console or other computer housing. The inserted ACM, once connected, serves as the central computing unit inside the combined APC. For a desktop APC, the combined ACM and peripheral console unit functions like a traditional desktop personal computer box. For a portable APC, a small ACM inserts into a portable console. The combined ACM and portable console functions like a traditional portable personal computer. Some of these components (or modules) can also be used in different computers, workstations, computerized television sets, and portable or laptop units.

The ACM has a variety of elements, which are enclosed in housing 12. They include, but are not limited, to the following components:

1) A single CPU with or without cache memory 13;
2) Core Logic device or means 15;
3) Main memory 17;
4) A single primary Hard Disk Drive ("HDD") 19 that is 2.5" or smaller;
5) Memory device with System BIOS 21;
6) Operating System, application software, data files on primary HDD 22;
7) Graphics Subsystem 23;
8) An interface device or means 25;
9) Clocking device or means 27;
10) Power regulation device or means (not shown);
11) Connector to peripheral console 11;

12) One or more circuit boards connecting the above components, and other accessories 29;

13) Heat management elements (e.g., blower, fins); and

14) Other elements, as desired.

The above elements are generally examples of the ones that can be found the present ACM. Depending upon the embodiment, there can also be other elements or some of the elements can be eliminated or combined. These and other details with regard to the present invention are described below.

The ACM housing 12 is made of suitable materials and has specific physical characteristics. The housing is made of a suitable material for mechanical construction to reduce size and thickness suitable for a portable computer. Preferably, the ACM has a thickness of less than 25 mm or 21 mm. The housing is also made of a material (e.g., aluminum, a bronze, a magnesium alloy, a titanium material, and a metal alloy) and is designed capable to dissipate significantly heat out of the enclosure. The ACM housing also provides for easy access to internal components for upgrade or maintenance. These components include the memory for SO-DIMM, the Hard Disk Drive, the battery, and others. The housing also protects the Hard Disk Drive from excessive heat, which can be from the CPU. Additionally, the housing provides for component positioning to improve high speed connection, thermal dissipation, and size. Furthermore, the housing provides for an ACM removal mechanism. Still further, the housing can maintain a HDD temperature of 55 degrees Celsius and less to prevent thermal damage to such HDD.

As shown, the enclosure has a top cover 31 and a bottom unit 33 made of a thermal conducting material, e.g. metal alloy, aluminum, aluminum allow, conductive plastic. The two parts overlaps and are screwed together to provide good thermal conduction, where the screws or fasteners can facilitate thermal conduction from the bottom to the top cover, which is used to dissipate heat. The top cover opens by removing the screws to allow for easy access to internal components. The housing also has a stepped down region 34 with reduced height designed for the backside of ACM to allow overlapping of CD-ROM or DVD drive and for reducing overall size of a notebook computer. The stepped down region in the backside of ACM facilitates insertion into a receptacle with a spring-loaded heat sink (on the peripheral computer or notebook) that presses against the top of the ACM after insertion. To avoid damage from any liquid spills or particles into the ACM, the top cover of ACM has substantially no openings for airflow in a specific embodiment. The stepped down region in the backside of ACM covers an area of the circuit board without active components, where a horizontal plane of the stepped down region presses against the circuit board end portion without active components. Air outlet is provided in the horizontal part of the stepped down back region to increase available air outlet. Air hole inlets are populated in the front and backside of ACM to allow outside air to flow from front to back inside the ACM. The ACM also has edge channels for support and other functions. Details of these edge channels are provided in the Fig. below.

The housing has connector 11, which is located on a backside of the ACM housing. The connector can be of any suitable pin design. In one aspect, the connector is a 160 pin design. Alternatively, the connector is a 200-pin ACI bus connector plug located on the backside of the ACM for mating to the receptacle connector. The connector location is offset to right hand side (back view) to create space for the CPU that is located on the left hand side towards the back of the ACM. The CPU location is always in the same region of the ACM to support proper cooling between ACM and peripheral console. In a specific embodiment, the connector is also suitable for at least 3,000 insertions or more or 5,000 insertions or more or 10,000 insertions or more.

Figure 1A:
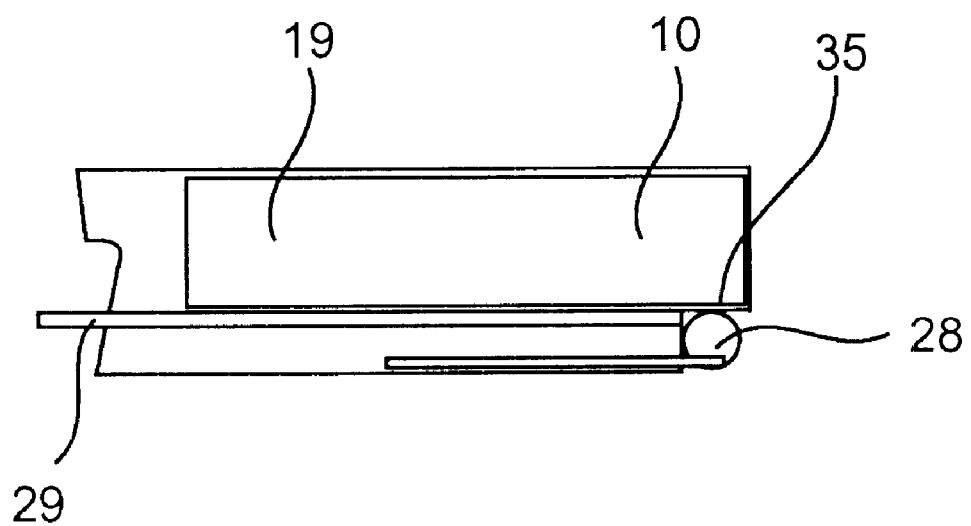

The ACM housing has a recessed region 35 for a handle 28 in some embodiments, such as the one in FIG. 1A. Here, a sliding handle 28 is located on the front side of ACM. The handle will push in and be held flush with the front surface of ACM to reduce overall length of the ACM. The handle can be pulled out to a stopped position. A user can use the handle to pull ACM out of a receptacle or bay of a console. The handle is also located on the bottom front part of the ACM, where a circuit board is sandwiched between the HDD and the handle. This allows for a 12.7 mm 2½" drive to be located directly on top on the handle to save space for the total length of the ACM. The handle size can be approximately 5 mm×5 mm. The HDD can fit into the opening right above the handle. Additionally, in other embodiments when a thinner ACM is desired, the top portion of the ACM will be reduced in height without affecting the handle mechanism on the bottom. The handle has a thin arm on each side that extends into the enclosure.

The housing includes a front panel which has light indicators or light emitting diodes, which are used for display. In a specific embodiment, the panel has a light pipe connected to two LED lights (one red and one green) disposed on the PCB position on the light pipe of the front panel. Here, the light pipe directs the light from the LED to the front panel for view by a user. The light pipe can also serve as a push button selector switch to a switch on the PCB to provide a signal to the system that the user wants to remove or perform other functions on the ACM. That is, the light pipe can be depressed to set functions in the ACM for removal of it from the bay. The LED lights are indications for power on/off, HDD active/not active, and computer module connection good/bad. The two LEDs are used to provide coded error messages through color pulse sequences in debug mode.

Referring to the Figs., the housing includes a front part or portion of ACM, which is used to house a 2½" HDD. In a preferred embodiment, a thermal conductive material is used to conduct heat from the HDD to the top cover of the ACM. The top cover (which has a large relative surface area) dissipates the heat away from the ACM. The ambient inside temperature for HDD should be kept below 55 degrees Celsius. In some embodiments, the housing has a HDD compartment to shield the HDD from the heat generated from the other components such as the microprocessing unit. The HDD sits on top of the PCB and connects directly to an IDE connector on the PCB. The HDD or its compartment is kept on left-hand side (front view) to permit better front to back airflow across CPU on the right-hand side. In an embodiment, the ACM housing has a 21 mm height (or less) to allow stacking of a 12.7 mm 2½" HDD on top of a PCB with components mounted on the backside. The ACM housing also can be 25 mm or less in height in other applications as well as other dimensions.

In one embodiment shown in FIG. 2, the ACM has a partition 100 between the hard disk drive and the microprocessing unit and associated power regulator. The partition isolates the hard disk drive from the microprocessing unit, which helps keep thermal energy in the form of head away from the disk drive. The partition also helps prevent electromagnetic radiation of the power regulator from influencing the hard disk drive. Such electromagnetic radiation can detrimentally cause errors and the like with the information stored on the drive. The partition is made of suitable material to electrically shield the hard disk drive.

The hard drive or mass storage unit typically includes a computer operating system, application software program files, data files, and the like. In a specific embodiment, the computer operating system may be the Windows98™ operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. The hard disk drive, however, can also be replaced by removable hard disk drives, read/write CD ROMs, flash memory, floppy disk drives, and the like. A small form factor, for example 2.5", is contemplated, however, other form factors, such as PC card, and the like are also contemplated. Mass storage unit may also support other interfaces than IDE.

Other components are also included in the ACM. For example, the ACM has the memory device or SODIMM located in a middle part or portion of ACM. The memory device can be partially under the heat fin and blower (or fan). A graphics subsystem is located close to the ACI Bus connector to reduce trace length for RGB analog signals and LVDS/TMDS flat panel signals. That is, the graphics subsystem is disposed adjacent to the ACI Bus. Host Interface Controller is located near the ACI Bus connector to reduce trace length for high-speed peripheral bus. Additionally, the ACM selectively places the CPU on right back corner (front view) to allow heated airflow from always blow out from the right hand side of ACM. The ACM also places the CPU bus controller next to CPU to shorten PCB trace for GTL+Host bus. CPU location can support proper PCB layout for socket CPU and an Intel Mobile Module, as well as other applications.

In a specific embodiment, the CPU can be any suitable microprocessing unit, microcontroller, digital signal processor, and the like. In a specific embodiment, the CPU is a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

Figure 4:
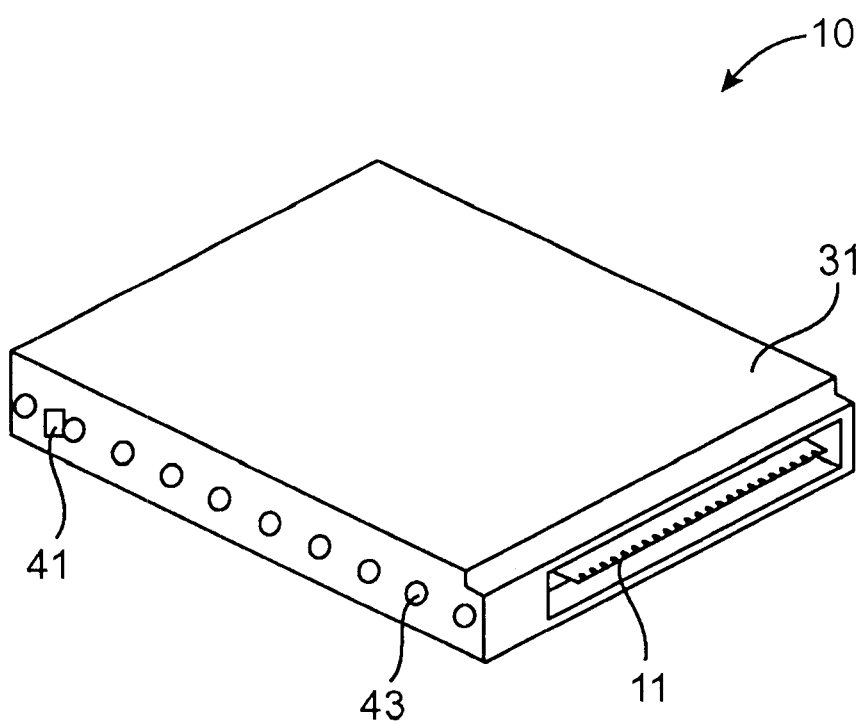
FIGS. 4 to 5 are simplified diagrams of improved ACM features according to embodiments of the present invention.
Figure 5:
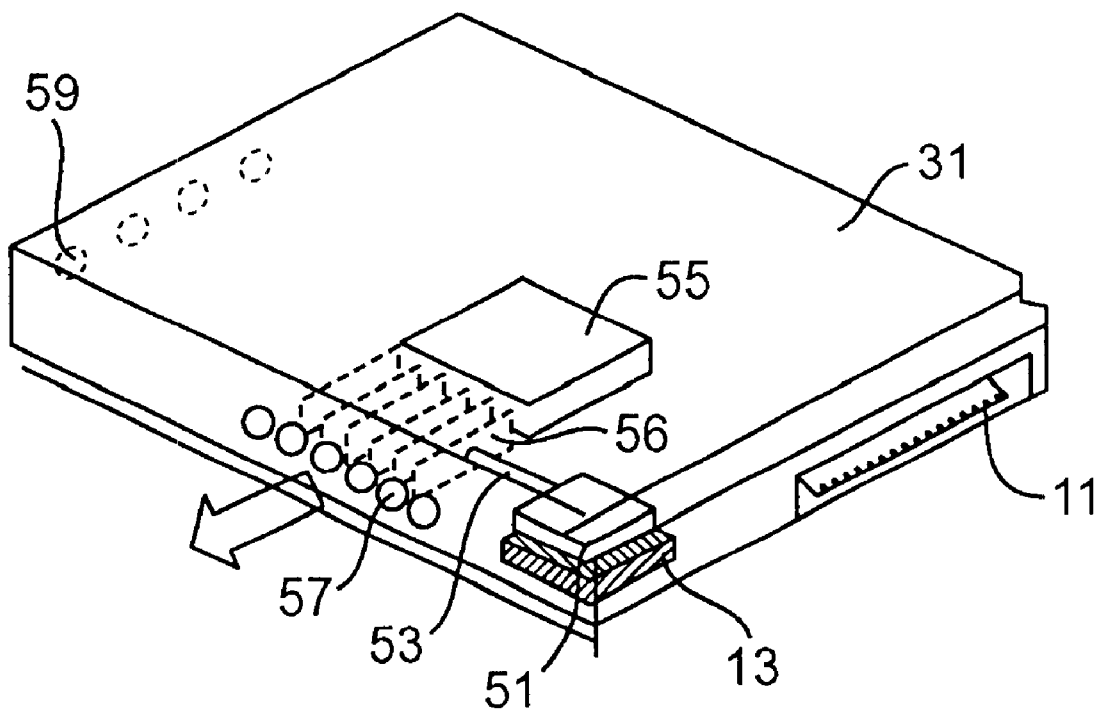
Figure 6:
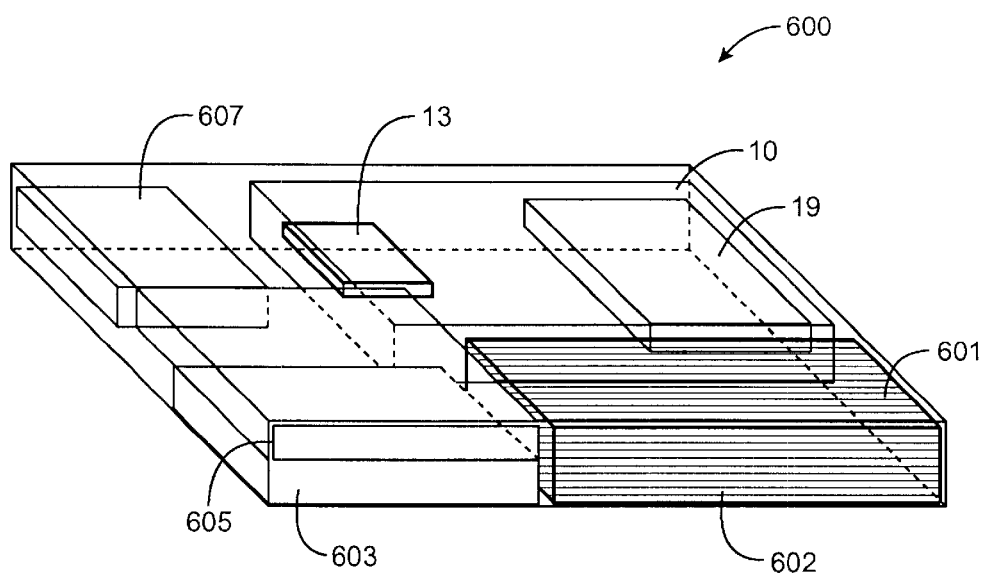
FIGS. 6 and 7 are simplified diagrams of an ACM for a notebook computer according to embodiments of the present invention.

FIGS. 4 to 6 are simplified diagrams of improved ACM features according to embodiments of the present invention. These diagrams are merely examples which should not limit the scope of the claims herein. One of ordinary skill in the art would recognize many other variations, modifications, and alternatives. Like reference numerals are used in these Figs. for cross-referencing purposes only. They are not intended to be limiting in any manner. Referring to FIG. 4, ACM 10 includes a variety of element such as a housing. The housing includes a top lid 31, which is a heat plate used for opening and accessing components, e.g., HDD, memory device. The housing also has connector 11. As shown, the ACM also has latch 41, which secures the ACM in place. ACM has a plurality of openings or vents 43 for air flow from the inner housing region to the outside of the housing.

Referring to FIG. 5, ACM 10 has cover 31 and connector 11. To cool the internal components of the ACM, front surface of the ACM has openings 59, which allow air to flow into the housing. A flow device such as fan 44, sucks in air from 59, passes the air through the housing, and disposes the air through fins 56 to openings 57, which are on the outside of the housing. The fins, which are made of a thermally conductive material, couple to a heat plate 51, which sits on the CPU 51. The heat plate transfers heat from the CPU to the heat plate, heat transfers from the heat plate through the heat pipe, heat transfers from the heat pipe to the fins, where heat is carried away using air from the fan.

In a specific embodiment, a horizontal fan (e.g., DC blower) blows air across a heat fin or heat sink structure that is either mounted on the CPU or thermally connected to the CPU through a heat pipe, which is made of a thermally conductive material. In a specific embodiment, the heat pipe can be a conductive housing including a fluid, where the fluid transfers heat from the computing device to the thermal element. The heated air will be blown out on the right hand side of ACM (front view) through openings. The CPU is attached to a heat conducting metal block with an embedded heat pipe to conduct heat away to the cooling fin structure. The heat fin structure is enclosed in a duct to allow air to flow linearly from the fan, across the fin and out the side of the ACM. Air outlet is often required at the middle edge section on the right-hand side (front view) of the ACM.

To promote efficient heat management in the housing, the present ACM places the CPU in a first portion, which keeps the CPU on a right back corner (front view) to allow heated air to always blow out from the right hand side of ACM, which is away from the HDD and other components. Here, the ACM also selectively places the CPU bus controller next to the CPU to shorten PCB trace for GTL+Host bus, which reduces noise to the CPU. The CPU location can support proper PCB layout for both Socket CPU and an Intel Mobile Module. The heat fin structure can be enclosed in a duct to allow air to flow linearly from the fan, across the fin to heat the air, and out the side.

Although the above has been described in terms of a specific configuration for a heat transfer device, many others may exist. For example, the present CPU can be coupled directly to the heating fins. Alternatively, the present CPU can be coupled directly to the fan. The CPU also can be coupled to the lid, which also facilitates heat transfer from the CPU to exterior regions or sinks. These and other aspects would be appreciated by one of ordinary skill in the art.

Figure 7:
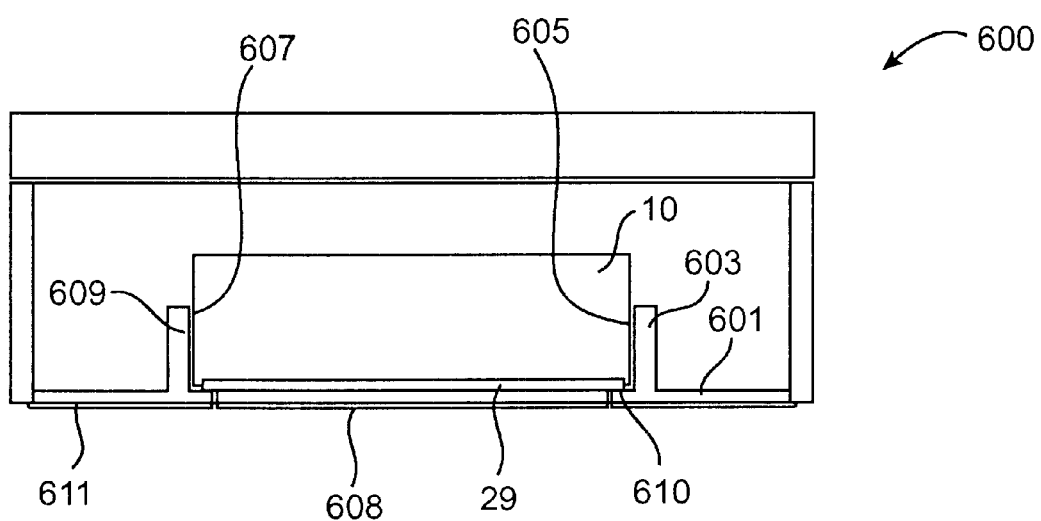

FIGS. 6 to 7 are simplified diagrams of an ACM in a notebook computer 600 according to embodiments of the present invention. These diagrams are merely examples which should not limit the scope of the claims herein. One of ordinary skill in the art would recognize many other variations, modifications, and alternatives. Like reference numerals are used in these Figs. for cross-referencing purposes only. They are not intended to be limiting in any manner. The notebook computer 600 includes a base 602 or housing. The notebook computer also includes a keyboard and a display (not shown). The base 602 is made of a suitable material that is durable and resistant to use and chemicals. The base also has sufficient structural support to house each of the elements in the housing. The base includes the ACM 10, which includes CPU 13 and hard disk drive 19. The housing also includes a battery, which is modular, and fits adjacent to the ACM on the front-side of the base. The battery and the ACM are disposed along a common plane. Behind the battery are memory devices including a CDROM 605 and a floppy disk drive 603. Here, the side of the battery and the CDROM and floppy drive sit along a common side of the base.

In a specific embodiment, the invention provides a method of installing the battery into a computer module. The method includes providing a computer module, which may have a "bad" battery, e.g., unreliable or low power. The computer module comprises a housing to enclose a hard disk drive, a battery socket comprising a plug-in battery, and a central processing unit coupled to the hard disk drive and coupled to the battery socket. The method removes a top cover from a base of the housing to expose the battery socket; and thereafter removes the used battery from the battery socket. A second battery is inserted into the socket. The top cover is them attached to the base of the housing. Next, a PC card 607 is disposed adjacent to the backside of the ACM and the memory devices. This configuration has a variety of benefits according to the present invention.

To reduce a thickness of the base, the present ACM has side edge channels, such as the ones in FIG. 7. Here, the ACM sits between two sides 603, 605, which are disposed on base 601 of the base housing. The sides are substantially vertical, but are not limited. That is, the sides may also be slanted, sloped, or any combination of these. Side 605 of ACM mates with a side of 603. Side 607 mates with a side of 609, which is disposed on base 601. The ACM includes the PCB, which extends to each of the two sides. Bottom 608 of the ACM is flush or is slightly recessed from the bottom of the base 611 of the housing. The bottom of the PCB rests on base 611. The ACM bottom also has a channel 610 on each side, which slides on the base. The edge channel along each of the sides of the enclosure bottom is designed to achieve one or more benefits. Here, the edge channel is used to reduce the total thickness of the notebook console. As noted, the bottom of the enclosure can be flush with the bottom of the notebook console. The console enclosure provides a guide as part of the enclosure to fit with the edge channel of the module. This approach can save 1.5 mm or more from the total thickness of the notebook console. The recessed edges also serve as standoff for the internal PCB from the bottom of the enclosure. The standoff height is designed to allow components to be mounted on the back of the PCB.

Figure 8:
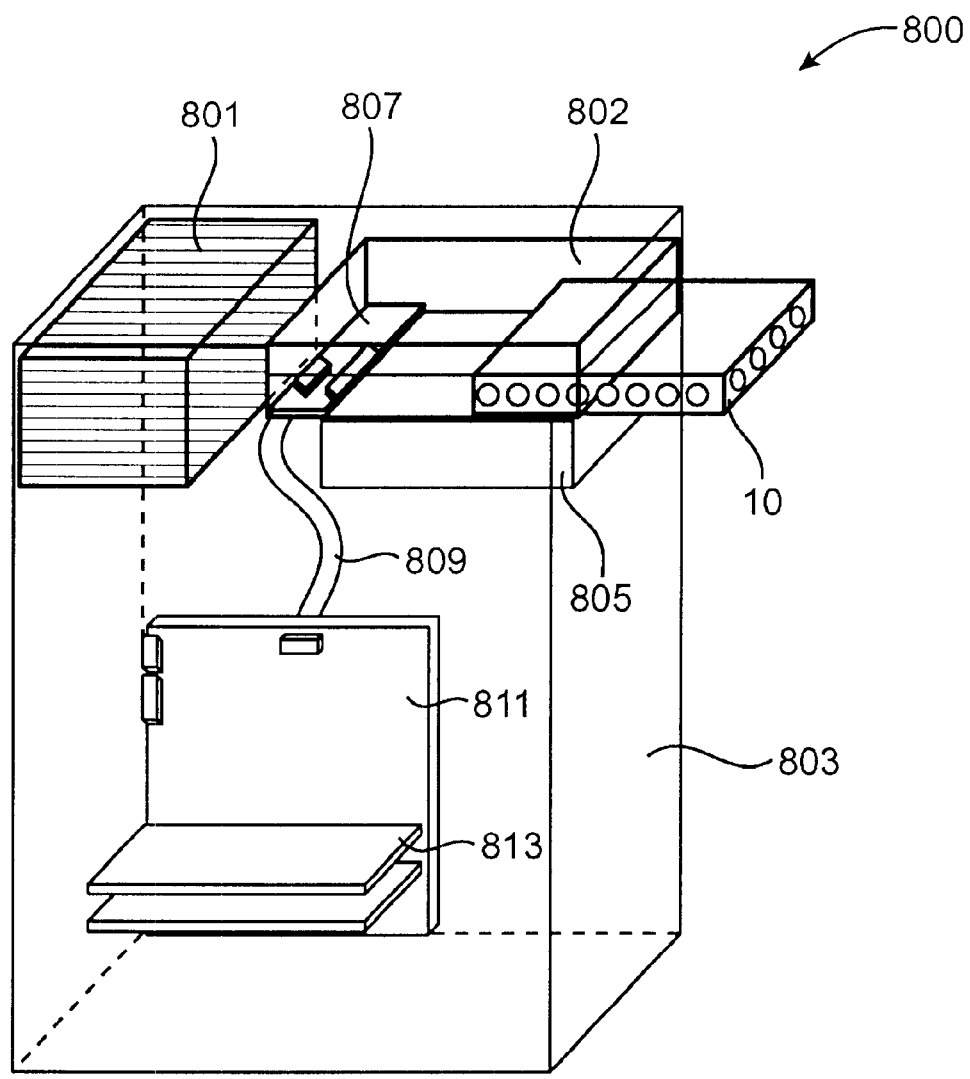
FIG. 8 is a simplified diagram of an ACM for a computer console according to an embodiment of the present invention

FIG. 8 is a simplified diagram of an ACM in a peripheral console 800 according to an embodiment of the present invention. These diagrams are merely examples which should not limit the scope of the claims herein. One of ordinary skill in the art would recognize many other variations, modifications, and alternatives. Like reference numerals are used in these Figs. for cross-referencing purposes only. They are not intended to be limiting in any manner. As shown, the console 800 includes housing 803, which holds a variety of elements. The elements or subsystems include a receptacle assembly, which holds and secures the ACM to the console. The receptacle has a connector 807, which couples to a peripheral board 811 through a plurality of connectors 809. The board has cards such as PCI cards 813. The board can also include networking cards and the like. The present console also includes power supply 801, which supplies power to each of the console elements, including the ACM. Other details may also exist depending upon the embodiment.

Although the functionality above has been generally described in terms of a specific sequence of steps, other steps can also be used. Here, the steps can be implemented in a combination of hardware, firmware, and software. Either of these can be further combined or even separated. Depending upon the embodiment, the functionality can be implemented in a number of different ways without departing from the spirit and scope of the claims herein. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A computer module comprising:

a housing comprising a first end coupled to a second end, and a base plate coupled between the first end and the second end, the first end facing the second end, where the base plate is disposed between the first end and the second end;

a first region disposed on the base plate at the second end, the first region comprising a connector, the connector protrudes outwardly from the housing from the second end;

a second region disposed between the first end and the second end, the second region adjacent to the first end, the second region comprising a hard disk drive;

a third region disposed between the first end and the second end, the third region adjacent to the first region and adjacent to the second end, the third region comprising a microprocessing unit;

wherein the second region is disposed along the first end of the housing to maximize a distance between the microprocessing unit and the hard disk drive to prevent a possibility of thermal damage of the hard disk drive from thermal energy from the microprocessing unit, the computer module further comprising a horizontal air blower disposed between the first region and the third region to direct air flow across the third region out to the side of the housing.

2. The computer module of claim 1 further comprising a heat pipe overlying a region on top of the microprocessing unit in the third region such that the horizontal blower directs air across the heat pipe.

3. The computer module of claim 2 further comprising of a thermal conductive material that is thermally coupled with the microprocessing unit through the heat pipe.

4. The computer module of claim 2 wherein the heat pipe is directly in contact with the top cover for thermal conduction.

5. A computer module comprising:

a housing comprising a first end coupled to a second end, and a base plate coupled between the first end and the second end, the first end facing the second end, where the base plate is disposed between the first end and the second end;

a first region disposed on the base plate at the second end, the first region comprising a connector, the connector protrudes outwardly from the housing from the second end;

a second region disposed between the first end and the second end, the second region adjacent to the first end, the second region comprising a hard disk drive;

a third region disposed between the first end and the second end, the third region adjacent to the first region and adjacent to the second end, the third region comprising a microprocessing unit;

wherein the second region is disposed along the first end of the housing to maximize a distance between the microprocessing unit and the hard disk drive to prevent a possibility of thermal damage of the hard disk drive from thermal energy from the microprocessing unit, and wherein the base plate comprises a side channel along each bottom edge, each of the side channels being used to guide for insertion of the computer module such that the connector mates with a second connector inside a peripheral console.

6. A computer module comprising:

a housing comprising a first end coupled to a second end, and a base plate coupled between the first end and the second end, the first end facing the second end, where the base plate is disposed between the first end and the second end;

a first region disposed on the base plate at the second end, the first region comprising a connector, the connector protrudes outwardly from the housing from the second end;

a second region disposed between the first end and the second end, the second region adjacent to the first end, the second region comprising a hard disk drive;

a third region disposed between the first end and the second end, the third region adjacent to the first region and adjacent to the second end, the third region comprising a microprocessing unit;

wherein the second region is disposed along the first end of the housing to maximize a distance between the microprocessing unit and the hard disk drive to prevent a possibility of thermal damage of the hard disk drive from thermal energy from the microprocessing unit, the computer module further comprising of a partition between the hard disk drive and the microprocessing unit and associated power regulator, the partition isolating the hard disk drive from the microprocessing unit heat and from the electromagnetic radiation of the power regulator.

* * * * *